United States Patent [19]

Smyser et al.

[11] 4,455,244

[45] Jun. 19, 1984

[54] OXIDIZED MANNICH CONDENSATION PRODUCT

[75] Inventors: Granville L. Smyser, Plainfield; John A. Cengel, Wheaton, both of Ill.

[73] Assignee: Standard Oil Company (Indiana), Chicago, Ill.

[21] Appl. No.: 385,457

[22] Filed: Jun. 7, 1982

[51] Int. Cl.$^3$ .............................................. C10M 1/32
[52] U.S. Cl. ................................ 252/51.5 R; 252/55; 252/51.5 A; 525/333.7
[58] Field of Search .................... 252/51.5 R, 51.5 A, 252/55, 33; 525/333.7

[56] References Cited

U.S. PATENT DOCUMENTS

| | | | |
|---|---|---|---|
| 4,011,380 | 3/1977 | West et al. | 252/55 |
| 4,131,553 | 12/1978 | West | 252/33 |
| 4,170,562 | 10/1979 | West | 252/51.5 A |
| 4,242,212 | 12/1980 | Harson | 252/51.5 R |

*Primary Examiner*—Jacqueline V. Howard
*Attorney, Agent, or Firm*—William H. Magidson; William T. McClain

[57] ABSTRACT

An oxidized Mannich condensation product of an oxidized olefin polymer, amine and formaldehyde yielding reactant and lube oils containing these products.

10 Claims, No Drawings

OXIDIZED MANNICH CONDENSATION PRODUCT

This invention relates to an oxidized Mannich condensation product of an oxidized olefin polymer, amine and formaldehyde yielding reactant and lube oils containing these products.

Commonly assigned U.S. Pat. No. 3,872,019 of Culbertson et al; 4,011,380 of West et al. and 4,131,553 of West (all of which are incorporated by reference) disclose the production of lube oil additives having dispersant and VI improving properties by the Mannich condensation of an oxidized long chain high molecular weight olefin polymer, a formaldehyde yielding reactant and an amine. While these products are excellent lube oil additives, the tendency to use smaller engines has resulted in lube oils being subjected to higher temperatures, particularly in those countries where there is no restriction on highway speed. It has now been found that at high temperatures, these lube oil additives have certain drawbacks, namely, the additives tend to be less compatible with the lube oil and the additives tend to attack fluorohydrocarbon engine seals. The incompatability is apparently due to the fact that at high temperatures, the lube oil additives are not sufficiently shear stable to withstand shearing action and there is a decrease in the viscosity of the additive resulting in reduced compatability with the lube oil. Accordingly, there is a need for additives of the type described in the aforesaid patents having improved shear stability and with a reduced tendency to attack fluorohydrocarbon engine seals.

The general object of this invention is to provide improved lube oil additives based on the Mannich condensation product of oxidized olefin polymers, amines and formaldehyde yielding reactant. A more specific object of this invention is to provide lube oil additives based on Mannich condensation products of oxidized long chain high molecular weight olefin polymers, amines and formaldehyde yielding reactants which have improved shear stability and reduced fluorohydrocarbon engine seal attack. Other objects appear hereinafter.

We have now found that the objects of this invention can be attained by oxidizing the Mannich reaction product of oxidized olefin polymers, amines, and formaldehyde yielding reactant. The second oxidization step results in lube oil additives having improved shear stability and reduced tendency to attack fluorohydrocarbon engine seals. In substance this invention resides primarily in modifying the process described in the aforesaid patents by carrying out the oxidation of the initial olefin polymer to a reduced extent (oxidized polymer has a higher viscosity), carrying out the Mannich condensation of polymer, amine and formaldehyde reactants and then reoxidizing the final product to the final viscosity for the particular lube oil grade.

Briefly, the product of this invention can be prepared by oxidizing a Mannich condensation product of an oxidized olefin polymer, amine and formaldehyde yielding reactant. In somewhat greater detail, the additives of this invention can be prepared by (1) oxidizing an olefinic polymer, (2) condensing under Mannich conditions the oxidized olefinic polymer of step (1), amine and formaldehyde yielding reactant and (3) oxidizing the reaction product of step 2.

The term "olefinic" polymer as used herein and in the claims refers to amorphous addition polymers or copolymers derived from olefinically unsaturated monomers or mixtures thereof. Such olefin monomers include olefins of the general formula $R-CH=CH_2$, in which R is hydrogen, an aliphatic or cycloaliphatic radical of from 1 to about 20 carbon atoms, for example, propene, isobutylene, 1-butene, 1-hexene, 4-methyl-1-pentene, and 1-decene. Other olefinic monomers having a plurality of double bonds can be used, in particular, diolefins containing from about 4 to about 25 carbon atoms, e.g., 1,3-butadiene, 1,4-hexadiene, 1,4-pentadiene, 2-methyl-1,3-butadiene, 1,5-hexadiene, 1,7-octadiene, 5-methylene-2-norbornene, norbornadiene, etc.

Suitable ethylene, propylene copolymers contain about 20 to about 65, preferably from about 35 to about 45, mole percent propylene having a number average molecular weight of at least 20,000, i.e., from about 20,000 to about 200,000 or more.

A particularly suitable ethylene-propylene copolymer is one having the following characteristics:

| | |
|---|---|
| Number Average Molecular Weight | About 60,000 |
| Percent (Molar) Propylene Monomer | 39–43 |
| Melt Flow | 2.2–3.3[A] |
| Mooney Viscosity | 65–75[B] |

[A] ASTM D-1238 10.1 Kg at 230° C.
[B] ASTM D-1646 ML 1 + 4 at 125° C.

Methods of preparation of the copolymers are well known. Such methods are described in many U.S. Patents, e.g. U.S. Pat. Nos. 2,700,633; 2,725,231; 2,792,288; 2,933,480; 3,000,866; 3,063,973; 3,093,621, and others, which are all incorporated by reference.

The polymer can be oxidized by contacting the polymer under suitable conditions of temperature and at atmospheric or elevated pressures with an oxidizing agent such as air or free oxygen or any oxygen containing material capable of releasing oxygen under these conditions. If desired, the oxidation can be conducted in the presence of known oxidation catalysts such as platinum or platinum group metals and compounds containing metals such as copper, iron, cobalt, cadmium, manganese, vanadium, etc. The oxidation can be carried out by methods described in U.S. Pat. Nos. 2,982,728; 3,316,177; 3,153,025; 3,865,499; and 3,544,520, which are all incorporated by reference.

Generally, the oxidation can be carried out over a wide temperature range, depending upon the oxidizing agent used; for example, with an active oxidizing agent, e.g., $SO_3$, temperatures in the range of $-40°$ F. to 400° F. can be used, while with less active oxidizing agents, e.g., air, temperatures in the range of 100°–800° F. can be used. The polymers are generally dissolved in oil prior to the oxidation. Further, depending upon the rate desired, the oxidation can be conducted at subatmospheric, atmospheric or super-atmospheric pressures, and in the presence or absence of oxidation catalysts. The conditions of temperature, pressure, oxygen content of the oxidizing agent, the rate of introducing the oxidizing agent, the catalyst employed, if any, etc., are correlated and controlled, by those skilled in the art, so as to obtain the desired optimum results.

The following illustrates a preferred method of oxidizing a polymer. To a copolymer of ethylene and propylene (7 parts), having a number average molecular weight of about 60,000 was added a solvent-extracted SAE 5W mineral oil (93 parts) in an open reaction vessel, and the mixture slowly stirred and heated at a temperature of 370° F., under an inert gas atmosphere, until the solution of the rubber-like polymer in the solvent was affected. Maintaining the 370° F. temperature, the mixture was rapidly agitated in an atmosphere composed of 50 percent air and 50 percent nitrogen, to promote the oxidation of the copolymer. A 50:50 air/nitrogen ratio was used to preclude the possibility of an explosive mixture being formed. Reaction in the described manner was continued for 2.0–4.0 hours. About 5–50 oxygen atoms per molecule of the copolymer were introduced under such oxidation conditions.

As indicated in U.S. Pat. Nos. 4,011,380 and 4,131,553, sulfonic acid compounds can be advantageously used in the oxidation. Some of the sulfonic acid compounds which can be used have the general formula:

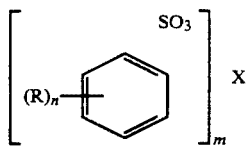

where R is alkyl, aryl, hydroxy, chloro or bromo substituted alkyl; n is an integer of 1–5, X is a cation and m is the valence of the cation. In some cases the R group can be made by polymerizing $C_2$–$C_6$ olefins to a molecular weight in the range of about 80 to about 100,000, preferably about 80 to about 1,000 and then attaching said group to a benzene ring by well known alkylation techniques.

R can be any hydrocarbon or substituted hydrocarbon which results in an oil-soluble benzene sulfonic acid. R can be a low molecular weight alkyl with greater than 9 carbon atoms such as nonyl, decyl, dodecyl, and the like with a molecular weight of at least about 120; an intermediate molecular weight hydrocarbyl such as polybutylene or polypropylene polymers with 15 to 1000 carbon atoms with a molecular weight of at least 200; a high molecular weight hydrocarbyl such as polyolefin having a number average molecular weight of 100,000; and others. R can be substituted with groups such as chlorine, bromine or hydroxy groups. Also, the benzene ring of the sulfonic acid may have more than one substituent alkyl or hydroxy or haloalkyl group. X is hydrogen, magnesium, calcium, sodium, amine, etc.

Other suitable oil-soluble benzene sulfonic acids are the oil-soluble petroleum sulfonic acids, commonly referred to as "mahogany acids" of about 350 to 750 molecular weight, aryl sulfonic acids, and alkaryl sulfonic acids. Illustrative of such sulfonic acids are dilauryl benzene sulfonic acid, and lauryl cetyl benzene sulfonic acid. Examples of other suitable sulfonic acids are diparaffin wax-substituted phenol sulfonic acids, cetyl chlorobenzene sulfonic acids, cetyl-phenol disulfide sulfonic acids, cetyl-phenol monosulfide sulfonic acids, cetoxy capryl benzene sulfonic acids. Other suitable oil-soluble sulfonic acids are described in the art, such as for example U.S. Pat. Nos. 2,616,604; 2,626,207; and 2,767,209, and others. A most important consideration in selecting an R group is that the final substituted compound be oil soluble.

The formaldehyde used in the Mannich reaction can be provided by any common formaldehyde yielding reagent. Examples of formaldehyde yielding reagents are formalin, paraformaldehyde, other linear and cyclic formaldehyde polymers, gaseous formaldehyde and the like.

The amine reactants used in the preparation of the products of the present invention are primary and secondary aliphatic amines containing up to 10 carbon atoms in the aliphatic groups; diamines of the general formula $NH_2(CH_2)_yNH_2$, wherein y is an integer of 2 to about 12; and polyalkyene polyamines of the general formula:

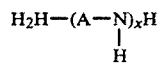

wherein A is a divalent alkylene radical of about 2 to about 12 carbon atoms, and X is an integer from about 1 to about 10. Illustrative of such suitable amines are: methylamine, dibutylamine, cyclohexylamine, propylamine, decylamine, ethylenediamine, trimethylenediamine, tetramethylenediamine, hexamethylenediamine, diethylenetriamine, triethylenetetramine, tetraethylenepentamine, tripropylenetetramine, tetrapropylenepentamine, and other polyalkylene polyamines in which the alkylene group contains up to about 12 carbon atoms.

An infrared spectroscopy method can be used to measure the completeness of the reaction used to produce the Mannich additive. A measurement of the 1680 $cm^{-1}$ adsorption of the Mannich additive which is about 0.220 per 0.5 mm cell path length indicates complete reaction and best additive properties, as determined by engine test values.

In greater detail, the Mannich reaction is preferably carried out with an amine, a formaldehyde yielding reagent, a copolymer oxidized in the presence or absence of sulfonic acid compound, and, if desired, an oil soluble sulfonic catalyst in an amount of about 0.01 to 40.0 weight percent sulfonic catalyst based on the neat polymer. A wide variety of such sulfonic acid compounds operate to catalyze the reaction. The functional group of the oil soluble sulfonic acid which provides the important catalytic properties is the sulfonic acid group.

The following illustrates a preferred method of conducting the Mannich condensation reaction with an oxidized polymer and sulfonic acid compound catalyst. One hundred parts of the oxidized copolymer in 1350 parts of SAE 5W mineral oil diluent was heated to 360° F. under a nitrogen blanket. Three parts of solid paraformaldehyde, 4.7 parts of molten hexamethylenediamine and 6.0 parts of an alkyl benzene sulfonic acid having a molecular weight of about 600 in a 39.0% by weight oil solution, were simultaneously added to the stirred reaction mixture at a temperature of 360° F. under a nitrogen blanket. The reaction was continued for 2 hours liberating water until complete. The mixture was stripped with nitrogen at 360° F. to remove water and other volatile byproducts. After filtration the mixture was clear.

The Mannich reaction is believed to occur between the active acidic protons on carbon atoms alpha to the carbonyl functions produced during the oxidation. Secondary reactions occur between the active reactants, carbonyl groups, and Mannich nitrogen atoms producing many varied crosslinked and aminated compounds. The active acidic protons react with formaldehyde and the amine. This introduces a detergent dispersant function in the polymer viscosity index improver additive.

The Mannich condensation reaction of the oxidized copolymers can be carried out in the presence of up to about 40 wt.%, preferably from about 0.10 wt.% to about 2 wt.% based on the polymer of an oil soluble sulfonic acid compound. A wide variety of such oil soluble sulfonic acids operate to increase the dispersancy detergent effect of the Mannich sulfonic acid copolymer product and the reaction rate producing the additive.

Preferably the sulfonic acid compound is not added prior to the amine. Sulfonic acid added to the oil-oxidized polymer prior to the amine rapidly decomposes, darkening the oil. The sulfonic acid when added after the amine, reacts with the amine. The acid is neutralized and stabilized preventing decomposition of the acid.

After the Mannich condensation, the second oxidation step is carried out at about the same temperature as the initial oxidation of the olefins by adding oxygen (e.g. 50:50 ratio of air to $N_2$) to the reaction mixture until the product has the desired viscosity.

The chemical composition of the final reaction product of the oxidized Mannich condensate of the oxidized polymer, the amine and the formaldehyde yielding reagent cannot be characterized with precise chemical formulas. The oxidation of the polymer produces predominantly carbonyl groups, although a minor amount of aldehyde, acid and perhaps ester may also be present in the polymer chain. In view of the complex nature of the final oxidized reaction product, the precise composition, reaction sites, and final structure of such product cannot be defined by a conventional chemical structure but rather must be defined purely through method of preparation and product properties. Chemical reactants which are added at different steps in the production beginning with the polymerization of the copolymer and ending with the reoxidation of the Mannich condensation reaction, produce useful compounds when added to the reaction at different steps. The reaction sites of the various chemical additives vary with the step in which the various chemical reactants are added. Therefore, a reactant added during the polymerization will produce unique effects on the chemical and physical properties of the polymer. Reactants which are added during the oxidation of the polymer and during the Mannich condensation reaction will produce different but unique effects. West, et al, U.S. Pat. No. 4,011,380, claims the use of a sulfonic acid or acid salt to promote oxidation of the copolymer. During the oxidation of the copolymer, the sulfonic acid appears to be chemically altered.

The described reaction products of the present invention are effective dispersant and viscosity index improving additives in lubricant compositions when used in amounts from about 0.1 to about 10 percent based on neat copolymer. Further, they tend to be shear stable and less prone to attack engine seals.

Suitable lubricating base oils are mineral oils, petroleum oils, synthetic lubricating oils such as those obtained by the polymerization of hydrocarbons, and other well known synthetic lubricating oils, and lubricating oils of animal or vegetable origin. Concentrates of a suitable oil base containing more than 10 weight percent, of one or more additives, can be used for blending with the lubricant oils in proportions desired for particular conditions or used to give finished products containing from about 0.1 to about 20% of additives of this invention.

EXAMPLE I

Three hundred fifty grams of an ethylene propylene copolymer containing about 40 mol % propylene having a molecular weight of about 60,000 was dissolved in 4,650 grams of 100N process oil at 280° to 300° F. with stirring under nitrogen in a flask fitted with a stirrer and means to sparge a 50/50 mixture of air and nitrogen through the contents. After 10 grams of an overbased magnesium polypropylbenzene sulfonic acid color inhibitor, having a molecular weight of 600, was added to the mixture and stirred overnight, 10 grams polypropylbenzene sulfonic acid oxidation catalyst was added. The oxidative degradation was then begun by heating to 370° F. and blowing nitrogen and air through the reaction media at 1600 cc/min and stirring at 325 RPM. After 1.87 hours the viscosity was reduced from 13213 Saybolt Universal Seconds at 210° F. to 1980 Saybolt Universal Seconds.

A Mannich condensation product of the oxidized polymer of the preceding paragraph was prepared by adding slowly with stirring at 360° F., in order; 8.25 grams polypropylbenzene sulfonic acid catalyst, 16.6 grams hexamethylenediamine, and 28.8 grams of a 37% aqueous solution of formaldehyde. After the addition of the reagents, the reaction was stirred one hour at 360° F. and then stripped with nitrogen for one hour.

The Mannich condensation product of the preceding paragraph was oxidized a second time by blowing a 50/50 nitrogen and air mixture through the reaction media at 1600 cc/min at 370° F. for 2.22 hours. The initial 2281 Saybolt Universal Seconds viscosity at 210° F. was reduced to 1149 Saybolt Universal Seconds at 210° F.

A control sample was prepared in the manner described above except that the second oxidation was omitted and the final viscosity of the product was 2459 Saybolt Universal Seconds at 210° F.

EXAMPLE II

Example I was repeated except that the second oxidation step was carried out using 10 grams of polypropylbenzene sulfonic acid as a catalyst and the additive viscosity was 1230 Saybolt Universal Seconds at 210° F.

EXAMPLE III

This Example illustrates the shear stability of the dispersant-viscosity modifiers prepared in Examples I and II. In general it is preferred that the Bosch shear stability should be no more than about 30.

TABLE I

| Additive | Example I Control | Example I | Example II |
|---|---|---|---|
| Additive Viscosity as made (SUS) at 210° F. | 2459 | 1152 | 1230 |
| Additive Level in 10W Oil % by Weight | 14.5 (7% Active) | 18.0 (7% Active) | 18.4 (7% Active) |
| Viscosity (SUS) at 210° F. of Treated 10W Oil | 69.1 | 69.5 | 70.6 |
| Bosch Shear Stability Index | 41.6 | 23.8 | 30.4 |

The above data clearly shows that reoxidation of the products of this invention improves the shear stability of the final product.

EXAMPLE IV

This Example illustrates that reoxidation reduces attack of fluorohydrocarbon seals.

TABLE II

| Additive | Example I Control | Example I | Example II |
| --- | --- | --- | --- |
| Additive Level in Test Oil % by Weight | 15% (7% Active) | 15% (7% Active); 20% (7% Active) | 14% (7% Active) |
| Fluorohydrocarbon Seal Type | Brown | Black Black | Brown |
| Days on Test | 7 | 7 7 | 3 |
| Crazing | Slight | No No | No |
| Instron Test - % Change in % Elongation | −35 | −12 −16 | −15 |
| Tensile Strength | −29 | −12 −19 | −3 |

The above data shows that reoxidation of the Mannich additive reduces fluorohydrocarbon seal attack.

We claim:

1. Oxidized Mannich condensation product of an oxidized olefin polymer, primary or secondary amine and formaldehyde yielding reactant.

2. The product of claim 1 wherein the amine comprises an alkylene polyamine.

3. The product of claim 2 wherein the alkylene polyamine comprises a polyalkylene polyamine.

4. The product of claim 1 wherein the oxidized olefin polymer comprises an ethylene-propylene copolymer.

5. An oxidized Mannich condensation product of oxidized ethylene-propylene copolymer rubber, alkylene diamine and formaldehyde yielding reactant.

6. A lubricating oil composition comprising the lubricating oil and 0.1 to about 20% by weight of the product of claim 1.

7. A lubricating oil composition comprising a lubricating oil and 0.1 to about 20% by weight of the product of claim 5.

8. The method of producing a lubricating oil additive which comprises (1) oxidizing a olefinic polymer (2) condensing under Mannich conditions the oxidized olefinic polymer of Step 1, primary or secondary amine and formaldehyde yielding reactant and (3) oxidizing the reaction product of Step 2.

9. The process of claim 8 wherein the amine comprises an alkylene polyamine.

10. The process of claim 9 wherein the olefinic polymer comprises ethylene-propylene rubber.

* * * * *